United States Patent [19]

Messing

[11] Patent Number: 4,550,464
[45] Date of Patent: Nov. 5, 1985

[54] DEVICE FOR CLEANING THE WHEELS PARTICULARLY THE RIMS OF A VEHICLE IN A CARWASH

[75] Inventor: Horst Messing, Lindlar, Fed. Rep. of Germany

[73] Assignee: Mr. Wash Auto-Service AG, Düsseldorf, Fed. Rep. of Germany

[21] Appl. No.: 549,854

[22] Filed: Nov. 9, 1983

[30] Foreign Application Priority Data

Nov. 10, 1982 [DE] Fed. Rep. of Germany ....... 3241559

[51] Int. Cl.[4] .............................................. B60S 3/06
[52] U.S. Cl. ................................ 15/53 B; 15/DIG. 2
[58] Field of Search ................ 15/53 A, 53 AB, 53 B, 15/DIG. 2

[56] References Cited

U.S. PATENT DOCUMENTS

| | | | |
|---|---|---|---|
| 1,412,732 | 4/1922 | Young | 15/53 B |
| 2,957,195 | 10/1960 | Almond | 15/DIG. 2 |
| 2,978,718 | 4/1961 | Vani et al. | 15/53 B |
| 3,058,133 | 10/1962 | Haverberg | 15/53 B |
| 3,783,465 | 1/1974 | Takeuchi | 15/53 B |
| 3,913,162 | 10/1975 | Parkin | 15/DIG. 2 |
| 4,192,037 | 3/1980 | Capra | 15/53 B |

Primary Examiner—Edward L. Roberts
Attorney, Agent, or Firm—Martin A. Farber

[57] ABSTRACT

A device for cleaning the wheels, and particularly the wheel rims, of a vehicle in a car wash. The device has a plurality of rotating cleaning brushes which can be pressed against the wheels to be cleaned substantially in a direction perpendicular to the direction of travel of said vehicle, and a driver which can be actuated by at least one of the wheels, the cleaning brushes for the specific pair of wheels to be cleaned being mounted on a carriage; the carriage is freely movable in the direction of travel of the vehicle, and is coupled to the driver; the driver is actuated by at least one of said wheels and with the carriage in a starting position, produces the commencement of the cleaning process. Upon termination of the cleaning process the corresponding carriage is released whereupon provision is made for restoring the device to the starting position.

16 Claims, 7 Drawing Figures

DEVICE FOR CLEANING THE WHEELS PARTICULARLY THE RIMS OF A VEHICLE IN A CARWASH

The present invention relates to a device for cleaning the wheels of a vehicle in a car wash, and more particularly to a device having rotating cleaning brushes which can be pressed against the wheels to be cleaned in a direction substantially perpendicular to the direction of travel of the vehicle as well as at least one driver which can be actuated by at least one of the wheels, the cleaning brushes for the specific pair of wheels to be cleaned being mounted for movement on carriages which are freely movable in the direction of travel of the vehicle, one of which carriages is equipped with the driver which can be actuated by at least one of the wheels of the vehicle and produces the commencement of the cleaning process and upon termination of the cleaning process releases the corresponding carriage, said device, furthermore, having a device for restoring to the starting position.

There are fundamentally two different types of automatic car washes. On the one hand, there is the so-called portal car wash, in which the vehicle to be washed stands stationary and the washing brushes, which are arranged on a portal, are moved along the vehicle. On the other hand, there are wash lines in which the vehicle is pulled through the car wash by means of a conveyor belt. In this case, the washing devices are arranged stationary along the direction of travel of the vehicle.

In such wash lines the cleaning of the wheels, and particularly of the wheel rims, constitutes a problem. The large washing brushes for the body are generally not able to clean the wheels satisfactorily. Therefore, special devices are used for cleaning the wheels. One such device is known from West German Patent No. 21 26 347. A rotating cleaning brush is so arranged at the end of a structure consisting of lever arms and articulated connections such that the cleaning brush is carried along in the direction of travel of the wheel, starting from a stationary pivot point. In order to start the cleaning process, a contact plate is provided in the travel path, which plate, when traveled over by the wheel, swings the lever structure, together with the cleaning brush, inwards and is pressed against the wheel. In this way, a driver which is fastened to the cleaning brush comes to lie in front of the wheel, as a result of which the entire structure is swung along and held in its position until the end of the cleaning process. In such a device, the inward swinging of the cleaning brush and the speed of the wheel must be accurately adapted to each other. In particular, this device is suitable only for a constant speed of the vehicle. When the speed is increased or reduced, depending on what is necessary at the car wash, the coordination of movement is no longer present so that the inwardly swinging cleaning brush does not strike precisely against the wheel.

These problems are solved in a device of the above type which is known from U.S. Pat. No. 3,913,162 since in this known device the inward swinging of the cleaning brushes and the subsequent synchronous forward movement of the cleaning brushes together with the wheels is possible regardless of the speed of the vehicle. This known cleaning device, however, makes it necessary to have two separate carriages for one pair of wheels to be cleaned, the synchronizing of the movement of the two carriages being effected by means of a system of ropes passed cross-wise over the vehicle, together with a plurality of pulleys. Each of these carriages has its own independent guide path, only one carriage being driven forward via the driver by one wheel while the other carriage is merely moved along via the said system of ropes from the directly driven carriage. In this case, the unavoidably long length of the ropes and the large elastic spring paths of the ropes inherent therein result, particularly during phases of acceleration of the directly actuated carriage, in poor synchronization of the movement of the other wheel with the merely indirectly actuated carriage. Such a spring action leads to oscillations of the two carriages in the direction of travel of the vehicle, so that the driver of the directly actuated carriage does not apply itself uniformly against the wheel driving it. In this way, even small irregularities in the guide system of the indirectly actuated carriage can have the result that this carriage is blocked briefly and the wheel of the vehicle rolls over the driver. It is self-evident that all the parts of the cleaning device which are then still in position can damage the vehicle. Another disadvantage of this known cleaning device is that the driver, which must be relatively long due to the different wheel tracks of different types of vehicles, transmits the drive force exerted on it by the wheel to the directly driven carriage only at the one end of the driver. Even slight irregularities, dirt and the like in the region of the path of movement of the driver therefore very easily lead to the blocking thereof, or at least to abrupt loads on the directly actuated carriage, which, in its turn, may lead to the aforementioned oscillations or to a complete blocking of the carriage. These known cleaning devices, therefore, require a very uniform and constant speed of the vehicle as it passes by, as well as only short acceleration of the cleaning device upon the start and termination of the cleaning process.

The object of the present invention is to provide a device of the aforementioned type for the cleaning of the wheels of a vehicle in a wash line, which operates reliably regardless of the speed of the vehicle as it moves past. In particular, the driver device is to be improved in conjunction with a simplified carriage structure.

According to the invention, a common carriage is provided for the cleaning brushes, and is arranged substantially below the plane of travel of the vehicle. The carriage may be mounted in a freely movable manner on rails via rollers, for instance diabolo rollers.

In accordance with the present invention, furthermore, there is preferably provided a driver roller which is arranged on the carriage and extends transversely to the direction of travel of the vehicle, it being adapted to be lowered into a depression below the path of travel of the vehicle in order to release the carriage. There is also preferably provided, a driver roller turnably pivoted via swing arms on the front end of the carriage and supported on guide rails which are bent downward for the lowering of the driver roller. The driver roller can be provided with rollers which are arranged laterally and rest on the guide rails.

The common carriage for both cleaning brushes which, in accordance with the invention, is guided below the floor, permits completely accurate synchronization of the forward movement of both cleaning brushes with the corresponding wheels and avoids any jerking or oscillating of the system so that it is impossible for the cleaning device to be blocked or for the wheel which drives the driver to travel over the driver. The carriage of the invention moves as a single system over guide rollers which make canting of the carriage due to the unilateral drive impossible. Irregularities in and dirt on the rails also do not lead to blocking if diabolo rollers and corresponding rail profiles are used, since such rollers are self-centering and their oblique travel surfaces remove dirt from the rollers by a shearing action. In this way, the danger of the blocking of the cleaning device is further reduced. Finally, the guiding of the drive roller by two swing arms favors the transmission of the drive force from the wheels to the carriage and further reduces the danger of canting of the carriage. The cleaning device of the invention is thus not sensitive to different speeds or jerk-like accelerations of the vehicle actuating them, so that the susceptibility to disturbance is greatly reduced.

In the starting position of the carriage, one driver roller is arranged above the plane of travel of the wheels. The driver roller, and thus the carriage, remain at rest until at least one wheel comes against the driver roller and pushes the latter in front thereof upon commencement of the cleaning process until, in the final position of the carriage, the driver roller swings down into a depression below the plane of travel at the termination of this cleaning process. The vehicle can then continue on its way without difficulty. After the above said wheel has passed the driver roller, the carriage, together with the driver roller, is moved back into the initial position via a restoring device.

In order, upon the conveying back of the carriage, to bring the downward swung driver roller more easily into its active position above the plane of travel, a spring against which the driver roller swings downward is preferably arranged between the driver roller and the carriage.

Finally, a restoring device is preferably provided comprising a rope having a restoring weight which acts via gravity, the rope traveling over one or more guide rollers and being fastened to the carriage. By this simple recovery device the backward movement of the carriage into the starting position is assured in a reliable fashion.

Further details, features and advantages of the invention can be noted from the following description of the corresponding drawings, in which.

Figure 1:
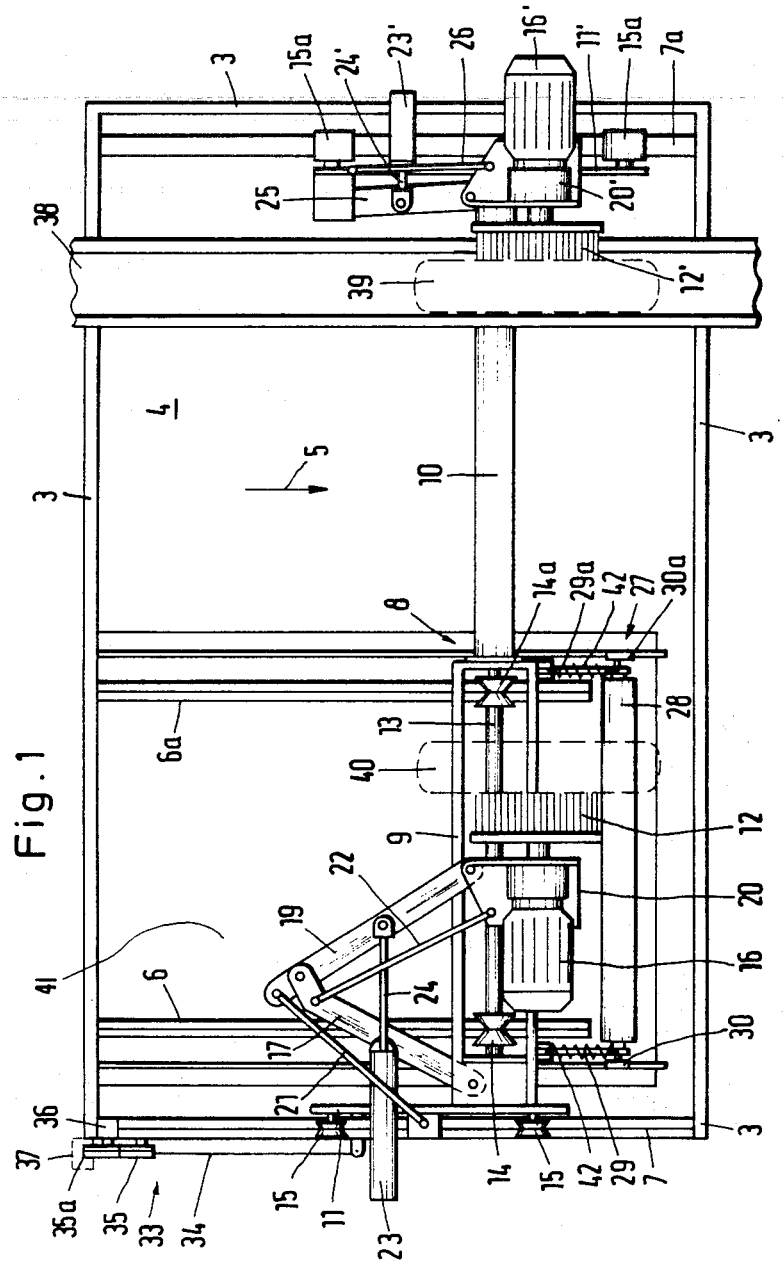
FIG. 1 is a top view of a device in accordance with the invention.

The device of the invention will be explained first with reference to FIGS. 1 to 3. Thereafter its manner of operation will be described in connection with FIGS. 4 to 7.

In the wash line, a parallelepiped recess 2 defined by side walls 3 and a bottom 4 is provided below the travel plane 1 in order to receive the device according to the invention for the cleaning of the wheels. The direction of travel of the vehicle is indicated by the arrow 5. On the bottom 4 of the recess 2, rails 6, 6a of substantially square cross-section are arranged, standing on edge, in the direction of travel 5. In addition, the side walls 3, which extend parallel to the direction of travel 5, are provided with rails 7, 7a.

The carriage 8 is mounted on the rails 6, 6a, 7, 7a. The carriage 8 consists essentially of a truck 9, a cross member 10 and laterally arranged mounting plates 11, 11' for the cleaning brushes 12, 12' and the holding and swinging mechanism described below. The truck 9 is provided with a fixed axle 13 which serves to receive the rollers 14, 14a. These rollers rest on the rails 6, 6a. Further rollers 15, 15a which travel on the rails 7, 7a mounted laterally on the mounting plates 11, 11'. Due to this construction of the carriage 8 it can move freely in the direction of travel 5.

The right-hand cleaning brush 12, as seen in the direction of travel 5, together with its drive motor 16, is connected swingably via a lever mechanism attached as shown to the truck 9 and mounting plate 11. For this purpose a first lever arm 17 is provided which is mounted swingably between two protruding elements 18 and 18a. On the front end of the lever arm 17 there is swingably arranged another lever arm 19 on whose front end an angle plate 20 is also swingably arranged in order to receive the drive motor 16. Tie rods 21, 22 are also provided attached as shown. The actuating cylinder 23 is pivotally connected to the lever arm 17 while its piston rod 24 is pivotally connected to the lever arm 19. Via this actuating cylinder 23 the above said lever mechanism with the cleaning brush 12 can be swung inwards perpendicular to the direction of travel 5.

A similarly operating mechanism for the cleaning brush 12', connected to drive motor 16', is provided on the left-hand side of the carriage 8, as seen in the direction of travel 5. Since, however, on this side the cleaning brush need be swung inward over only a small distance, only one lever arm 25 and one tie rod 26 are provided here, where the piston rod 24' of activating cylinder 23' is pivotally connected to lever arm 25. As will be understood by those of ordinary skill in the art, lever arm 25 is swingably arranged with angle plate 20' to receive drive motor 16', where cleaning brush 12' and drive motor 16' are coupled swingably to truck 9 via mounting plate 11' and cross-member 10, as seen in FIGS. 1-3.

The driver 27 is arranged in the front end of the truck 9. The driver consists of a transversely extending rotatably mounted drive roller 28 which is pivoted on the truck 9 by swing arms 29, 29a. Laterally on the drive roller 28 there are arranged rollers 30, 30a which rest on guide rails 31, 31a. The guide rails 31, 31a, which extend parallel to the rails 6, 6a, are bent downward at their front ends so that they define a depression 32.

On the right hand side of the carriage 8 a restoring device 33 is provided. For this purpose, a rope 34 is attached to the mounting plate 11 and guided over guide rollers 35, 35a, the guide roller 35a being arranged at the top of a pole 36. A restoring weight 37 is arranged at the end of the rope 34. This restoring device 33 endeavors, due to the restoring weight 37 which acts by gravity, to move the carriage opposite the direction of travel 5.

Over the depression 2, on the left hand side, there extends a guide channel 38 for the left wheel 39 of the car (where the car is not otherwise shown). This guide channel 38 is provided with a conventional tow device (not shown) which moves the vehicle and thus the wheel 39, forward in the direction of travel 5 in a conventional manner. The right-hand wheel 40 travels on a runway plate 41 which partially covers the depression 2.

The manner of operation of the device decribed above will be now described with respect to FIGS. 4 to 7. For the sake of simplicity and a better understanding, the essential elements have been shown merely diagrammatically in these drawings.

Figure 4:
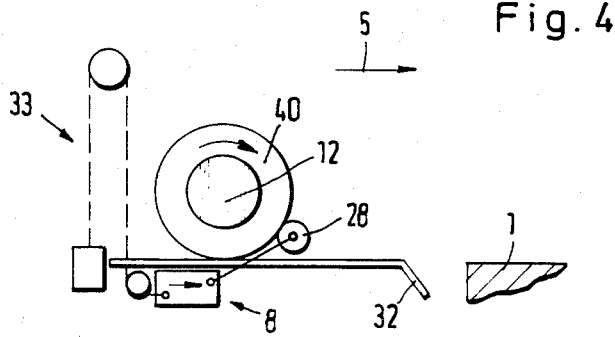
FIGS. 4 to 7 show diagrammatically the manner of operation of the device of the invention in four steps.
Figure 5:
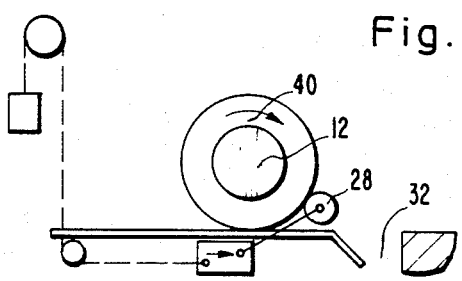

In FIG. 4 the carriage 8 together with the driver roller 28 is shown in its starting position, as a result of the action of the restoring device 33. The tire of wheel 40 of the vehicle which is travelling in the direction 5 pushes against the driver roller 28 and moves the latter ahead of it, together with the carriage 8 and the cleaning brushes 12, 12', (although only brush 12 of brushes 12, 12' is shown in FIGS. 4 to 7). Although not detailed in FIGS. 4 to 7, it will now be understood by those of ordinary skill that during the entire following course of movement of the roller 28, the laterally arranged rotating cleaning brushes 12, 12' will be stationed alongside the earlier-described wheels 39, 40. It is thus in this position that cleaning will be achieved. The cleaning brushes 12, 12' are swung inwards by means of the actuating cylinders 23, 23' and are pressed against the wheels 39, 40. Shortly before the driver roller 28 has reached the depression 32 such as at the position indicated in FIG. 5, the cleaning brushes 12, 12' are swung outward by action of actuating cylinders 23, 23'. As will be understood by those of ordinary skill in the art, actuating cylinders 23, 23' may be actuated in any conventional manner.

Figure 6:
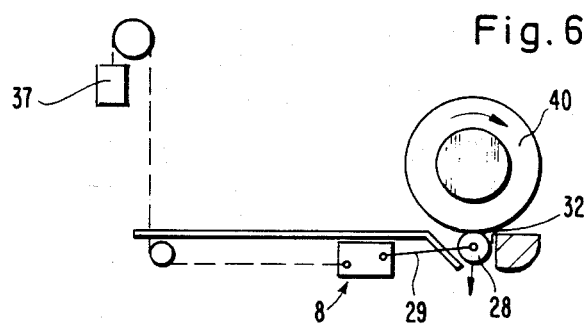
Figure 7:
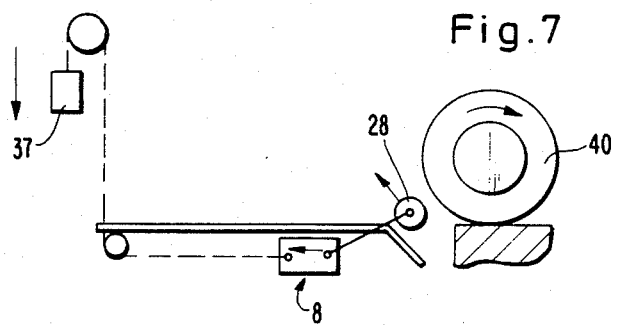

FIG. 6 shows how the driver roller 28, which is pivoted by the earlier described swing arms 29, 29a to the carriage 8, descends into the depression 32 (although only swing arm 29 of arms 29, 29a is shown in FIG. 6). In this phase, the engagement between the wheel 40 and the driver roller 28 is eliminated so that the wheel can travel over the roller. As the detail of FIG. 7 indicates, the restoring weight 37 now moves the carriage 8, together with the driver roller 28 and the cleaning brushes 12, 12', back into the starting position, where a new cleaning process can commence (although it will be understood that merely for ease of description, brushes 12, 12' are not shown in FIG. 7).

Figure 2:
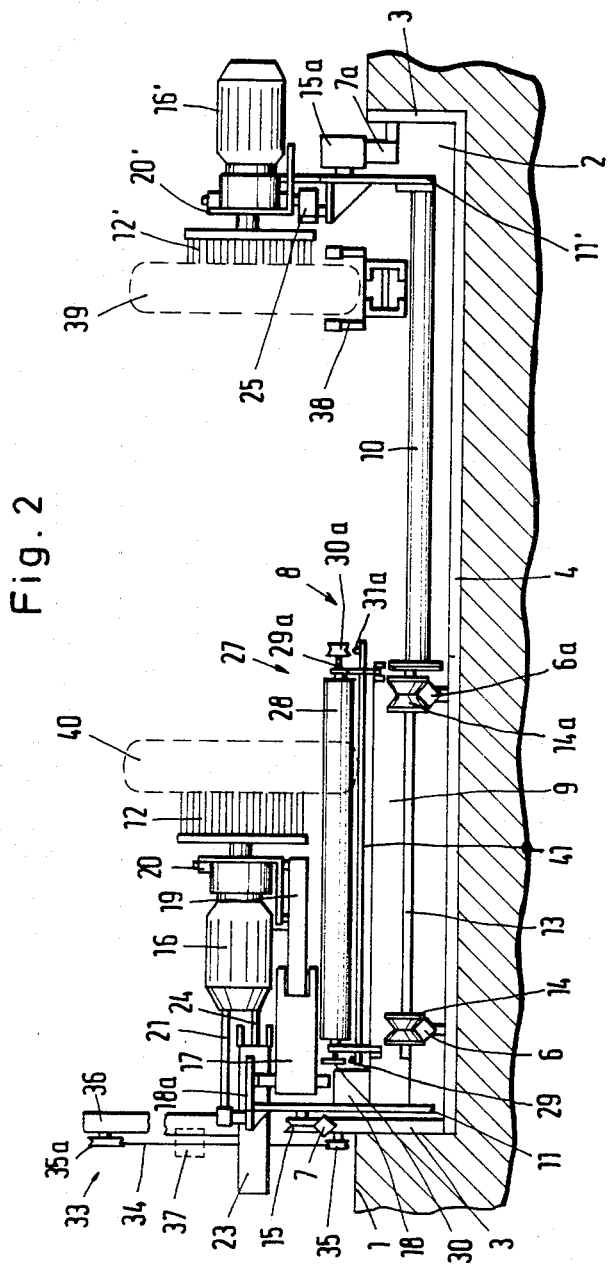
FIG. 2 is a front view of the device.
Figure 3:
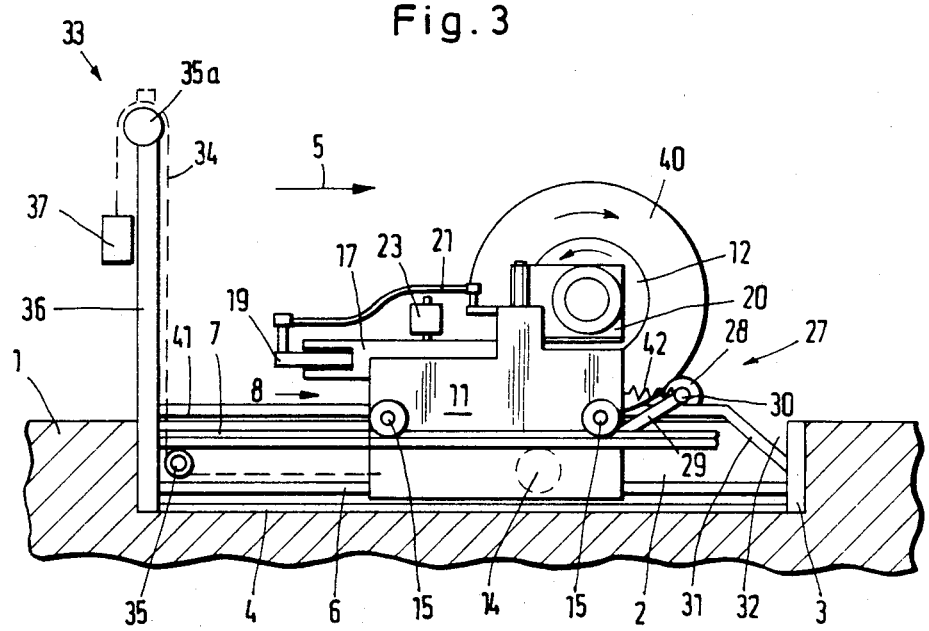
FIG. 3 is a side view of the device.

In order to move the driver roller 28 more easily upwards out of the depression 32, a spring 42, as seen in FIGS. 1 and 3, is provided between drive roller 28 and the carriage 8. The spring operates in conventional manner to urge the driver roller 28 out of depression 32 after the above said wheel has overpassed it.

It is to be understood that the above-described embodiments are merely illustrative of the application of the principles of this invention. Numerous variations may be devised by those skilled in the art without departing from the spirit or scope of the present invention.

I claim:

1. An apparatus for cleaning the rims of laterally spaced wheels of a vehicle moving along a plane of travel in a car wash, comprising
   means comprising a plurality of rotating cleaning brushes for pressing against respective of the rims of said wheels substantially in a direction perpendicular to the direction of travel of said vehicle in a cleaning process,
   at least one driver drivable by at least one of said wheels,
   a common carriage which is freely movable from a starting position in the direction of travel of said vehicle being operatively connected to said driver,
   said plurality of brushes being mounted on said common carriage,
   means for restoring said common carriage to said starting position,
   said common carriage being actuated for moving along with the vehicle by at least one of said wheels via said at least one driver, the cleaning process commencing during said moving, and said common carriage being released via release of said driver from said at least one wheel at the end of said cleaning process whereupon said means for restoring returns said common carriage to said starting position,
   said driver comprises a plurality of swing arms and a driver roller engageable by said at least one wheel for pushing said driver forward along with the movement of the vehicle,
   a plurality of guide rails,
   said driver roller being rotatably pivotally connected via said plurality of swing arms to a front portion of said common carriage and being operatively mounted on said plurality of guide rails,
   each of said guide rails being bent downwardly at a downwardly bent portion thereof adjacent a portion of the car wash corresponding to the end of the cleaning process so as to cause lowering of said driver roller beneath said plane of travel of the wheels of the vehicle so that said at least one wheel of said vehicle passes over said driver roller releasing the latter and causing said means for restoring to return said common carriage to said starting position.

2. The apparatus according to claim 1, wherein
   said common carriage is arranged essentially below the plane of travel of said vehicle, and further comprising
   a plurality of additional rails and a plurality of rollers, said common carriage being mounted freely movably on said plurality of additional rails via said plurality of rollers, respectively.

3. The apparatus according to claim 2, wherein
   said plurality of rollers further comprises diabolo rollers.

4. The apparatus according to claim 1, wherein
   said driver further comprises a plurality of lateral rollers operatively connected on lateral sides of said driver roller, said lateral rollers rest on respective of said plurality of guide rails.

5. The apparatus according to claim 1, wherein
   one of said rotating cleaning brushes is for pressing against one of said laterally spaced wheels and another of said rotating cleaning brushes is for pressing against another of said laterally spaced wheels,
   a guide channel at said plane of travel extending parallel to the direction of movement of the vehicle constituting means for receiving said another of said wheels of the vehicle therein,
   said carriage includes a cross member extending below said guide channel.

6. The apparatus according to claim 5, further comprising
   a running plate at said plane of travel and adapted to receive said one of said laterally spaced wheels,
   said carriage is disposed beneath said running plate,
   carriage rails extending parallel to said direction of travel of the vehicle,
   said carriage includes a fixed axle,
   diablo rollers are mounted at ends at said fixed axle and on said carriage rails, said fixed axle is located lower than said driver roller and extends substantially parallel thereto and has substantially the same length, said driver roller operatively engaging said one of said laterally spaced wheels.

7. The apparatus according to claim 5, further comprising
walls defining a parallelpiped recess under said plane of travel, the latter including a floor, said recess having a bottom and lateral side walls parallel to the direction of movement of the vehicle,
mounting plates disposed at opposite ends of said carriage including on one end of said cross member, respectively,
said rotating cleaning brushes are rotatable and movably mounted on said mounting plates,
roller means mounted on lateral sides of said mounting plates,
carriage rails mounted on said lateral side walls of said depression extend parallel to the direction of movement of said vehicle,
said roller means are guided on said carriage rails.

8. The apparatus according to claim 1, wherein said driver roller operatively engages only one of said wheels of the vehicle.

9. The apparatus according to claim 1, wherein each of said guide rails have a horizontal portion parallel to the direction of movement of the vehicle, said downwardly bent portion extending along the direction of movement of the vehicle and inclined downwardly from said horizontal portion forming a recess under said plane of travel, said driver roller at said bent portion extends into said recess.

10. The apparatus according to claim 1, further comprising
motor means operatively connected to said brushes, respectively, for rotating said brushes,
at least one lever pivotally mounted to said carriage,
an angle plate on which said motor means is mounted,
said lever is pivotally connected to said angle plate,
an actuating member having a cylinder operatively connected to said carriage and having a piston rod pivotally connected to said lever for moving said lever,
a tie rod connected to said lever and said angle plate, and
said lever and said tie rod are horizontally disposed.

11. The apparatus according to claim 1, further comprising
a compression spring means connected between said carriage and said driver roller for biasing said driver roller in a direction of movement toward said carriage and upwardly to a portion of said guide rail above said plane of travel after said at least one wheel has passed over said driver roller.

12. The apparatus according to claim 1, wherein said restoring means includes a support member having a guide roller mounted thereon at a portion higher than said carriage,
a restoring weight,
a rope connected to said restoring weight and extending over said guide roller and operatively connected to a rear portion of said carriage biasing said carriage to return to the starting position.

13. Apparatus for cleaning the wheels of a vehicle moving through a car wash, comprising:
a plurality of cleaning brushes;
said brushes adapted for being pressed against selected ones of said wheels in a cleaning process;
a common carriage for carrying said brushes;
means for driving said carriage at least through the cleaning process, the latter commencing adjacent a starting position of said carriage;
means for restoring said carriage to said starting position at the end of the cleaning process;
said means for driving cooperating with at least one of said wheels to move said carriage from said starting position and said means for driving being passed over by said at least one wheel when said cleaning process is terminated, said means for restoring thereupon facilitating return of said carriage back to said starting position;
said carriage is arranged essentially below a plane of travel of said vehicle through the car wash;
said means for driving includes a plurality of swing arms pivotally mounted to said carriage for pivotally mounting said means for driving to said carriage;
a plurality of guide rails; and
said means for driving being swingably pivoted by means of said plurality of swing arms so said means for driving is pivotable up and down and being operatively mounted on said plurality of guide rails so as to enable said means for driving to said cooperation with said at least one of said wheels to move said carriage, and said means for driving being pivotable down below said plane of travel of said vehicle through the car wash at the end of the cleaning process so said means for driving is enabled to be passed over by said at least one wheel.

14. Apparatus for cleaning the wheels of a vehicle moving through a car wash, comprising:
a plurality of cleaning brushes;
said brushes adapted for being pressed against selected ones of said wheels in a cleaning process;
a common carriage for carrying said brushes;
means for driving said carriage at least through the cleaning process, the latter commencing adjacent a starting position of said carriage;
means for restoring said carriage to said starting position at the end of the cleaning process;
said means for driving cooperating with at least one of said wheels to move said carriage from said starting position and said means for driving being passed over by said at least one wheel when said cleaning process is terminated, said means for restoring thereupon facilitating return of said carriage back to said starting position;
said carriage is arranged essentially below a plane of travel of said vehicle through the car wash;
a plurality of rails and a plurality of rollers, wherein said carriage is mounted in a freely movable fashion for travel in the direction of movement of said vehicle on said plurality of rails via said plurality of rollers; and
a plurality of guide rails, said means for driving being operatively mounted on said plurality of guide rails, said plurality of guide rails is disposed downwardly adjacent a portion of the car wash corresponding to the end of the cleaning process so as to cause lowering of said means for driving below the plane of travel of said vehicle.

15. The apparatus according to claim 14, wherein said means for driving is located at a leading portion of said carriage.

16. Apparatus for cleaning the wheels of a vehicle moving through a car wash, comprising:

a plurality of cleaning brushes;

said brushes adapted for being pressed against selected ones of said wheels in a cleaning process;

a common carriage for carrying said brushes;

means for driving said carriage at least through the cleaning process, the latter commencing adjacent a starting position of said carriage;

means for restoring said carriage to said starting position at the end of the cleaning process;

said means for driving comprises a driver roller cooperating with at least one of said wheels to move said carriage from said starting position and said driver roller being passed over by said at least one wheel when said cleaning process is terminated, said means for restoring thereupon facilitating return of said carriage back to said starting position;

means for supporting the vehicle on its wheels, defining a track of travel of said vehicle through the car wash;

said carriage is arranged substantially below said track of travel of said vehicle through the car wash and is independent of said supporting means and thereby free of the weight of said vehicle;

said driver roller is movable up and down, respectively, relative to said at least one of said wheels;

a plurality of guide rails; and said means for driving further comprises a plurality of laterally arranged rollers, said plurality of laterally arranged rollers resting on selected ones of said plurality of guide rails, the latter for guiding said laterally arranged rollers so as to enable said driver roller to said cooperation with said at least one of said wheels to move said carriage, and said driver roller being movable down relatively below said track of travel of said vehicle through the car wash at the end of the cleaning process so said driver roller is enabled to be passed over by said at least one wheel.

* * * * *